United States Patent [19]

Breedijk

[11] 4,095,464

[45] Jun. 20, 1978

[54] METHOD AND APPARATUS FOR TIRE TREAD ANALYSIS

[75] Inventor: Frans Nico Breedijk, Hunsdorf, Luxembourg

[73] Assignee: The Goodyear Tire & Rubber Company, Akron, Ohio

[21] Appl. No.: 697,816

[22] Filed: Jun. 21, 1976

[51] Int. Cl.$^2$ ...................... B60C 11/00; G01M 17/02
[52] U.S. Cl. ...................................... 73/146; 356/212; 358/101; 358/106
[58] Field of Search ............................ 73/146, 8, 172; 356/218, 212; 179/100.3 R; 358/106, 107, 101; 354/62, 109

[56] References Cited

U.S. PATENT DOCUMENTS

| | | | |
|---|---|---|---|
| 2,096,615 | 10/1937 | MacDonald et al. | 73/172 |
| 3,174,414 | 3/1965 | Myer | 354/62 |
| 3,755,659 | 8/1973 | Bolhuis | 73/146 |
| 3,856,410 | 12/1974 | Swift et al. | 358/107 |
| 3,894,437 | 7/1975 | Hagy et al. | 73/172 |

OTHER PUBLICATIONS

Publ.–"An Apparatus for Determining . . . Footprint Area of Tires" by Pizer/Spinner, (2/1970) Materials Research & Standards, vol. 10, No. 2, pp. 20–23, 63.
Publ.–"Non-Destructive Tire Analysis" by R. F. Wolf, Rubber Age 4/1970, pp. 58–64.

*Primary Examiner*—Daniel M. Yasich
*Attorney, Agent, or Firm*—L. A. Germain

[57] ABSTRACT

Static and/or dynamic surface contact areas created by tire tread patterns are automatically analyzed by obtaining a high contrast black and white photographic image of the contact area made by the tread pattern. The photographic image is illuminated and the luminous energy emitted is optoelectronically converted to an electrical signal indicative of the tread contact area. The electrical signal is compared to an electrical reference signal that is established as a control contact area to provide an indication of the difference between the tread pattern contact area and the reference control contact area.

The foregoing abstract is not to be taken as limiting the invention of this application, and in order to understand the full nature and extent of the technical disclosure of this application, reference must be made to the accompanying drawing and the following detailed description.

17 Claims, 7 Drawing Figures

METHOD AND APPARATUS FOR TIRE TREAD ANALYSIS

BACKGROUND OF THE INVENTION

This invention relates generally to vehicle tire analysis and more specifically to a method and apparatus for improving the accuracy, efficiency, and reliability of analyzing tire tread patterns and the contact areas produced by such patterns under various static and/or dynamic conditions.

In the manufacture of vehicle tires, tread design is of particular significance as it translates into vehicle handling characteristics under various road surface conditions. This being the circumstance, various methods of tread analysis have been developed to investigate tread pattern effect as it relates to tread contact area under several conditions, one particular being hydroplaning on a wet road surface.

One of these methods involves placing the tire in a tire deflection machine and applying various static loads to the tire to obtain a deflection "footprint" of the tread contact area. In this respect, the tread is painted and placed on a contrasting surface such that a high contrast image of the deflected tread pattern is produced. The image is then compared to a reference image by a visual comparison or by an actual measurement of the contact areas of the image.

Another of these methods is generally known in the industry as aquaplane photoanalysis. This method involves photographing a tire "footprint" as it traverses a wet glass plate. The plate is generally covered with a colored fluid to aid in photo contrast, and high speed color photographs are taken through the glass plate as the tire travels over it at a specific speed. Upon developing the film, a color photopositive print is obtained with the tread contact area being defined by black areas while all other areas are defined by the color of the fluid on the plate. Thus, the photograph provides a means for analyzing the ability of the tire to maintain road surface contact under various water versus speed conditions.

Techniques for analyzing these photographs involve comparing a reference print which represents 100 percent tread contact area to the dynamic print that is usually something less than 100 percent contact area depending upon the ability of the tread pattern to "shed" water. In one technique of evaluating aquaplane photographs, the tread contact areas are manually integrated by tracing a planometer around the border of the black areas. This measurement is compared with a similar measurement taken on a static photograph of the same tread pattern. Another technique involves placing the dynamic photopositive print over the static or reference print and visually comparing, block by block, the tread contact areas of the two prints.

Thus, the present methods of tire tread analysis are essentially human oriented and, therefore, suffer some distinct disadvantages. For example, the accuracy of integrating the tread contact area is limited by the ability of the individual to distinguish the black versus color boundary. Furthermore, being a manual operation, each tread "footprint" takes approximately 20 to 30 minutes to integrate depending upon the amount of contact area to cover and the accuracy of the measurement desired. Naturally, a more painstaking measurement will result in greater accuracy but at the expense of increased time. This being the circumstance, the number of tests that may be analyzed or evaluated for each tread design is time limited and the cost per test becomes a matter of concern.

In view of these disadvantages, it is apparent that a need exists for a more accurate, reliable and efficient method of tire tread pattern analysis. It is accordingly among the principal objects of the invention to provide a method and apparatus for analyzing tire tread contact area images that avoids the disadvantages of the prior art, yields reliable results, and is a quick and automatic operation.

Generally, the principal object and other objects and advantages are achieved by providing a method and apparatus in which the high contrast black and white images are produced of the tire tread contact area in static and/or dynamic condition. The tread contact image is illuminated and optoelectronically converted to an electrical signal such that a comparison may be made between it and a reference representative of a control base tread contact condition. The comparison results in a readout useful in an analysis of tire tread pattern effect.

The features and advantages of the invention may best be understood by reference to the description that follows taken in conjunction with the accompanying drawings in the several figures of which like reference numerals identify like elements and in which:

FIG. 1 diagrammatically illustrates the method of the invention wherein a photopositive image of the tread contact area is analyzed; FIG. 2 diagramatically illustrates the method of the invention wherein a photonegative image of the tread contact area is analyzed;

FIG. 3 diagramatically illustrates the method of the invention wherein a shutter TV camera is used to analyze the tread contact area image;

FIG. 4 pictorially illustrates apparatus for accomplishing the method shown in FIG. 1;

DESCRIPTION OF THE INVENTION

Figure 1:
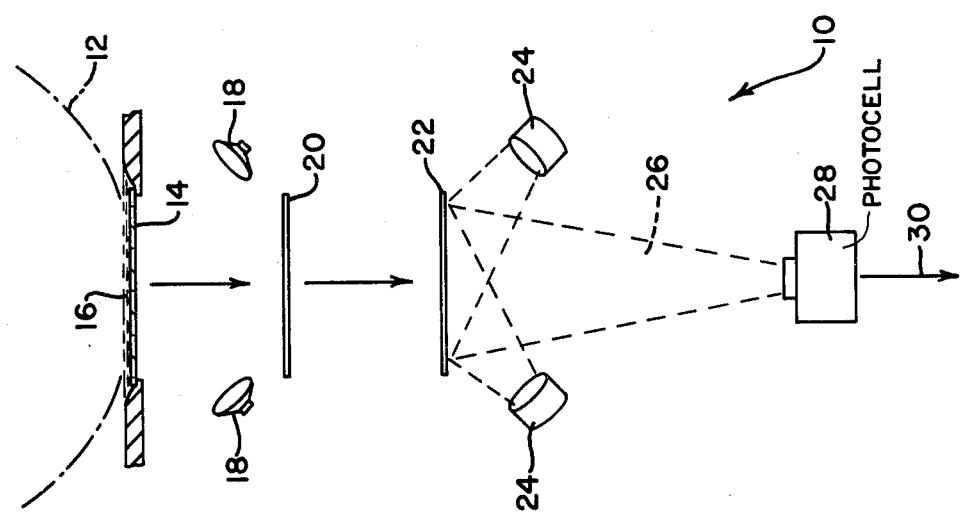

Referring to the drawings, FIG. 1 diagramatically illustrates apparatus generally indicated by reference numeral 10 for automatically integrating the contact area of a vehicle tire 12. The tire may be in a static or dynamic condition on a glass plate 14 carrying a colored fluid medium 16 thereon to enhance the contrast between tread portions in contact with the plate surface and tread portions not in contact with the plate surface. The image, as defined by the contact area of the tire tread pattern, is illuminated by photoflash lamps 18 such that the contact image is captured on a photosensitive medium 20. The photosensitive medium 20 is converted to a high contrast black and white photopositive print 22 with the black image of the print defining the tread contact area while the white image of the print defines the noncontact area of the tread pattern. The photopositive is illuminated by high intensity lamps 24 and the luminous energy 26, reflected from the white area of the photopositive, is focused on a photocell 28 whose output current 30 is proportional to the cell illumination or conversely inversely proportional to the black area of the tread contact image. This output signal forms the basis for analyzing differences in tire tread contact area images as will be understood hereinafter as the description proceeds.

Figure 2:
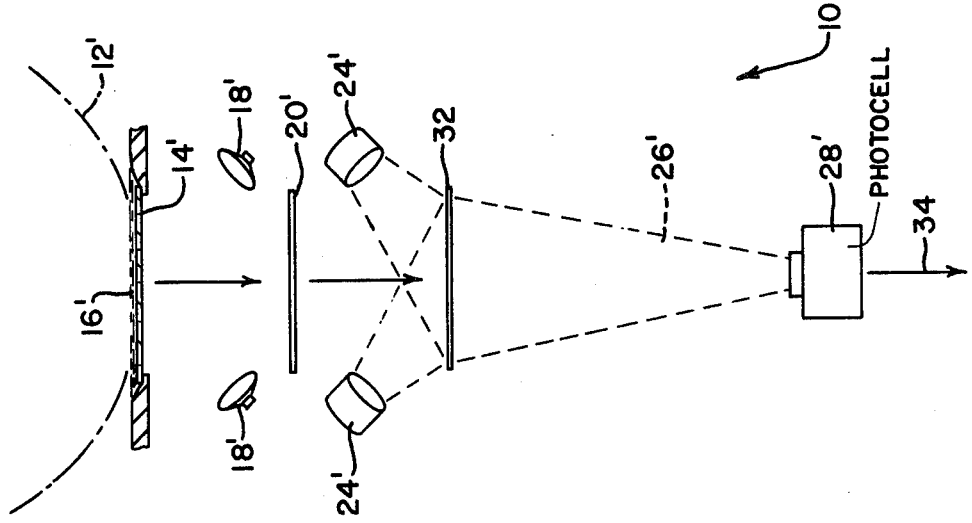

FIG. 2 diagramatically illustrates a variation in apparatus generally indicated by reference numeral 10' for analyzing the tread contact area of a tire 12'. In this embodiment the tire is in static or dynamic condition on the glass plate 14' to provide a tread contact image of the pattern with a colored fluid 16' thereon to enhance the contrast in the manner described herebefore with respect to FIG. 1. The tread contact image is again illuminated by photoflash lamps 18' and captured on a photosensitive medium 20'. The photosensitive medium is developed into a high contrast photonegative 32 that is subsequently backlighted by high intensity lamps 24'. The luminous energy 26' transmitted through the photonegative is focused on a photocell 28' that converts the luminous energy into an output current 34 indicative of the contact area image of the tire tread pattern. In this arrangement the photocell current indicative of the luminous energy focused thereon is directly proportional to the tread area in contact with the glass plate.

Figure 3:
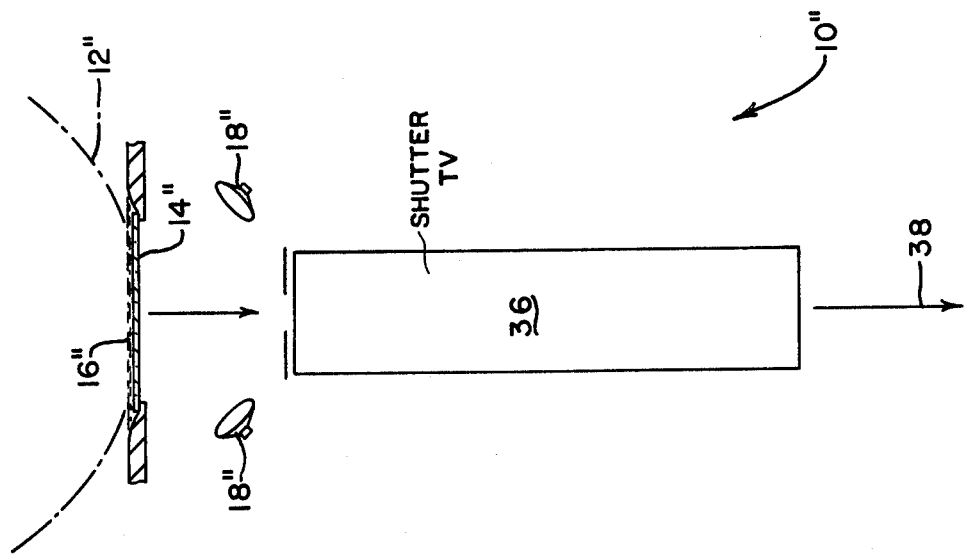

FIG. 3 diagramatically illustrates another variation of apparatus generally indicated by reference numeral 10" also useful for analyzing the tread contact area of a tire 12". Again, the tire is imaged through a glass plate 14" and illuminated by photoflash lamps 18". In this embodiment the tread contact image is captured by a high-speed shutter-type TV camera 36 that converts it to an output electrical signal 38 that is indicative of the contact area image of the tire tread pattern.

Returning now to FIGS. 1 and 2, many and various type photosensitive mediums 20 may be used to obtain the high contrast photopositive 22 and/or photonegative 32. For example, photosensitive plates and/or films may be used as is well understood by those knowledgeable in the photographic arts. However, it has been found that photographic films exhibiting a specific spectral sensitivity provide very sharp black versus white contrast between the tread contact areas and the noncontact areas covered by colored fluid on the glass plate. For example, an orthochromatic (green sensitive) high contrast film used in combination with a green dyed fluid provides a black and white photopositive similar to that illustrated in FIG. 5. More specifically, an Agfa-Ortho 25 Professional photographic film or equivalent in combination with fluorcene sodium in a 0.5 percent solution will result in a photopositive of the black versus white order and quality shown in FIGS. 5 and 6. Of course a red dyed fluid in combination with red sensitive films or other equivalents may be used as is well understood by knowledgeable persons in the photographic arts.

Figure 4:
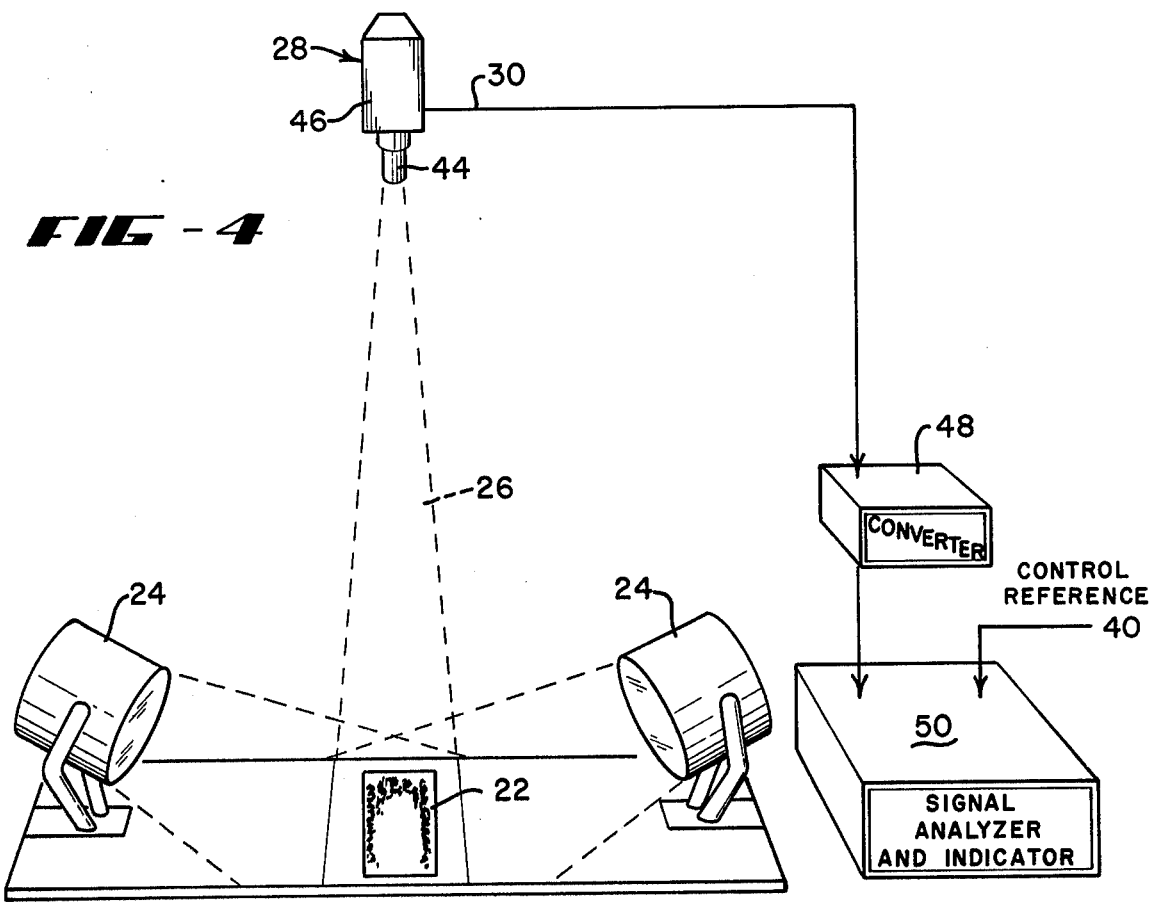

FIG. 4 more specifically illustrates apparatus for automatically integrating the tire tread contact area image as defined by a photopositive 12. The photopositive is mounted so that it may be illuminated by high intensity lamps 24 and the reflected luminous energy 26 from the area image is focused by a lens unit 44 into an optoelectronic unit 46. Unit 46 may comprise a photocell exhibiting a linear responsivity such as Phillips DPX41 where the responsivity is defined as the ratio of the current produced by a cell to the amount of luminous energy on it.

Figure 5:
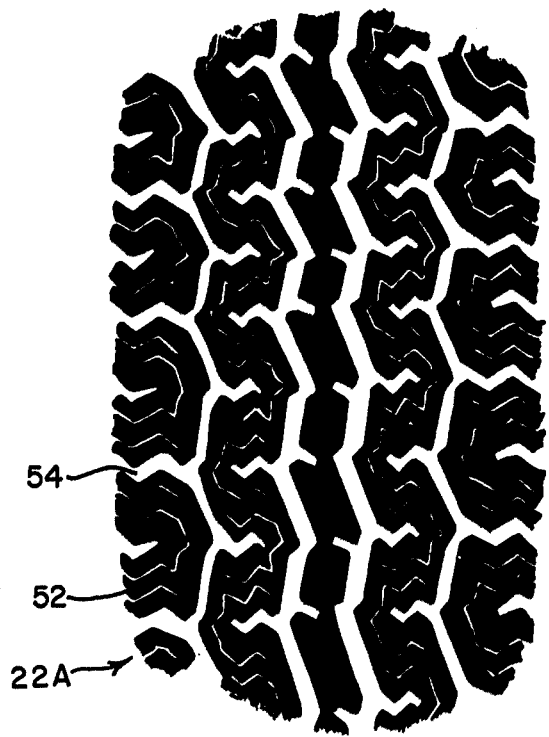
FIG. 5 illustrates a black and white high contrast photopositive of the tire tread image taken with the tire in a static condition.
Figure 6:
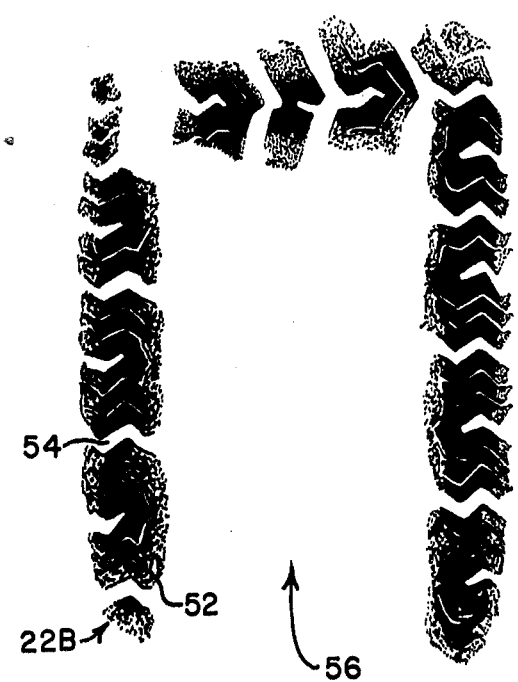
FIG. 6 illustrates a black and white high contrast photopositive of the tire tread image of FIG. 5 but taken with the tire in a dynamic condition.

Upon illuminating the photopositive 12 and focusing the reflected luminous energy onto the cell 46, an output current 30 is generated that is proportional to the cell illumination. The current signal 30 is fed into a converter 48 that converts the signal to a voltage that may be fed into a signal analyzer and readout device 50 for a comparison with an arbitrary control reference 40. The reference 40 may be a pre-established signal indicative of an optimum tread contact area or it may be any other type control signal. Or, referring to FIGS. 5 and 6, the control signal may be a first stored signal indicative of the tread contact area image 22A of a tire in a static condition that is first converted in the converter 48 to a signal representative of 100 percent tread contact. As illustrated in FIG. 5, the tread contact areas 52 present a black photopositive image while the noncontact areas 54 present a white photopositive image. Because luminous energy is reflected from the white image, a small amount of output current 30 may be generated that is established in the converter as a 100 percent comparison figure. In the case of a dynamic tire condition as illustrated in FIG. 6, the photopositive 22B is made with the tire traveling across the glass plate at a specific speed. Because of hydroplaning, the tread contact image area 52 is substantially reduced resulting in a larger white area image 56 that will produce an increased amount of reflected luminous energy and thus an increased output current. This second signal indicative of the dynamic tread contact condition is subsequently compared in the signal analyzer to provide a readout representing a percent of the total contact area with respect to the static tread contact image.

Figure 7:
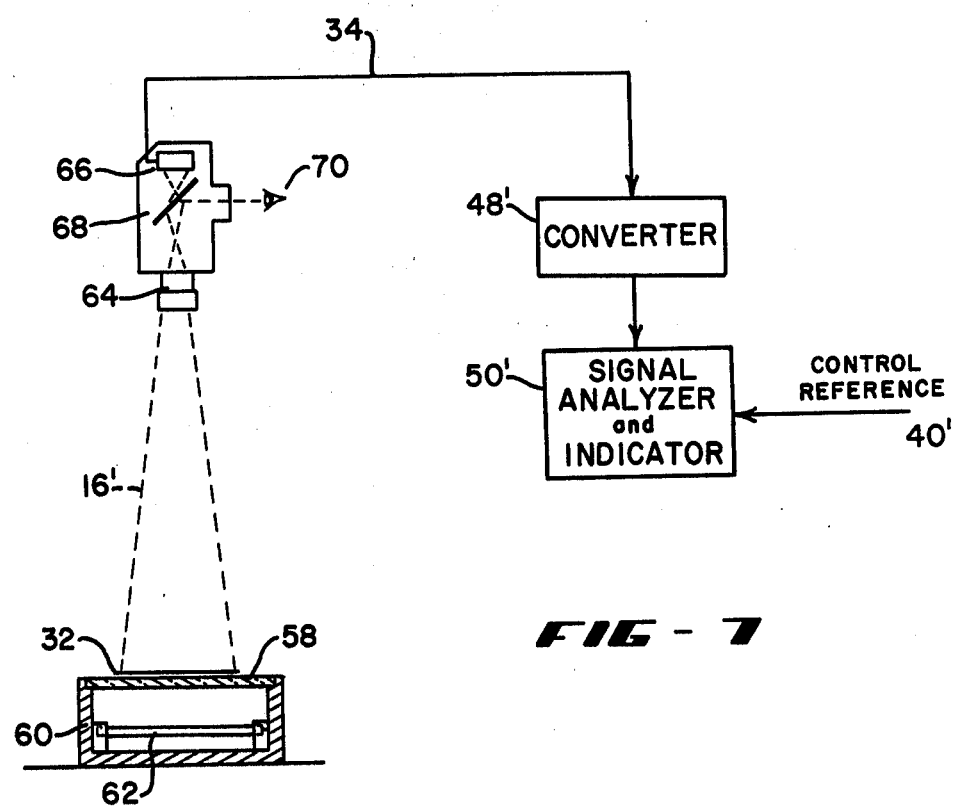
FIG. 7 pictorially illustrates apparatus for accomplishing the embodiment of the method shown in FIG. 2.

FIG. 7 illustrates specific apparatus in a configuration utilizing a high contrast photonegative 32. In this embodiment the photonegative 32 is developed and mounted on a matt glass plate 58 of a diffuse light box 60 and is subsequently back-lighted by a lamp 62. Being a negative image of the tread contact area, the luminous energy is transmitted through the photonegative and is focused by a lens unit 64 comprising a zoom lens arrangement for varying into a photocell unit 66 that outputs a current 34 proportional to the light transmitted through the negative. Unit 66 may include viewing means 68 so that an observer 70 may focus on the field of the photonegative. In the same manner as described for the photopositive of FIG. 4, the output current signal 34 is fed into a converter 48' that converts the signal to a voltage indicative of the illumination of the photocell and is subsequently compared in a signal analyzer and readout device 50' to provide an indication of the comparitive difference between the photonegative tread contact image and a control reference.

While certain representative embodiments and details have been shown for the purpose of illustrating the invention, it will be apparent to those skilled in the art that various changes and modifications may be made therein without departing from the spirit or scope of the invention.

What is claimed is:

1. A method of analyzing surface contact areas created by tire tread patterns comprising the steps of:

A. providing a high contrast image as defined by the tire tread contact area selectively established on a transparent plate having a preselected colored fluid thereon to optimize the contrast between the tread in contact with the plate and tread not in contact with the plate;

B. illuminating the image;

C. photographing the tread contact image on a high-speed, high contrast black and white photosensitive medium having a spectral sensitivity for the colored fluid on the plate to provide a photographic image of the tread contact area;
D. illuminating the photographic image;
E. optoelectronically converting the illuminated photographic image to an electrical signal indicative of the tread contact area;
F. providing an electrical reference signal that is established as a control contact area; and
G. comparing the signal indicative of the tread contact area to the reference control signal to obtain a visual readout indicative of a percentage of the control reference.

2. The method as set forth in claim 1 wherein the high contrast image as defined by the tire tread contact area is provided by placing a green-dyed fluid on the plate and the photographic image is provided by photographing the tread contact image on high contrast orthochromatic film.

3. The method as set forth in claim 2 wherein the high contrast image as defined by the tire tread contact area is enhanced by placing an 0.5% solution of fluorescein sodium on the plate.

4. The method as set forth in claim 2 wherein optoelectronically converting the image comprises:
a. illuminating the photopositive; and
b. converting reflected luminous energy from the photopositive to an electrical signal.

5. The method as set forth in claim 1 wherein a high contrast photonegative is made of the tread contact image.

6. The method as set forth in claim 5 wherein optoelectronically converting the image comprises:
a. illuminating the photonegative; and
b. converting luminous energy passing through the photonegative to an electrical signal.

7. The method as set forth in claim 1 wherein the step of photographing the tread contact image to provide a photoraphic image of the tread contact area includes converting the photographic image to a photopositive print.

8. A method of analyzing surface contact areas created by tire tread patterns comprising the steps of:
A. providing a transparent plate having a preselected colored fluid thereon such as to optimize an image as defined by the tire tread contact area of a tire tread when it is in contact with the plate;
B. placing a tire on the plate in a tread contact static condition to provide a first image of the tread contact area;
C. illuminating the tread contact image on the plate and photographing the tread contact image through the plate on a high-speed, high contrast black and white photosensitive medium having a spectral sensitivity for the colored fluid to provide a photographic image of the static tread contact area;
D. moving the tire across the plate in a tread contact dynamic condition to provide a second image of the tire tread contact area;
E. illuminating the dynamic tread contact image as the tire traverses the plate and photographing the image through the plate to provide a photographic image of the dynamic tread contaact area;
F. optoelectronically converting the photographic images thus obtained to electrical signals indicative of the static and dynamic tread contact areas respectively; and
G. comparing the signals to provide a visual readout indicative of the difference between the tread in contact with the plate in the static condition and the tread in contact with the plate in the dynamic condition.

9. The method as set forth in claim 8 wherein comparing of the signals comprises the steps of:
a. converting the signal indicative of the static condition to a voltage level representative of 100 percent tread contact area;
b. converting the signal indicative of the dynamic condition to a voltage level representative of its tread contact area; and
c. comparing the voltages and converting the comparison to a readout representative of the dynamic tread contact area as a percent of the static tread contact area.

10. The method as set forth in claim 9 wherein photopositives are developed and the images converted to electrical signals by:
a. illuminating the photopositive for each condition; and
b. converting the luminous energy reflected from the photopositives to respective electrical signals.

11. The method as set forth in claim 9 wherein photonegatives are developed and the images converted to electrical signals by:
a. illuminating the photonegatives for each condition; and
b. converting the luminous energy transmitted through each photonegative to respective electrical signals.

12. Apparatus for analyzing the tire tread patterns with respect to their surface contact area comprising:
means to generate a selectively established tire tread contact image as defined by the tire tread contact area comprising a transparent plate having a preselected colored fluid thereon to provide a contrast between tread areas in contact with the plate and areas not in contact with the plate;
means to illuminate the tread contact image;
photographic means to capture the tread contact image through the plate on a high contrast photosensitized medium having a spectral sensitivity for the colored fluid on the plate and to provide a photographic image of the tread contact area;
means to illuminate the photographic image;
optoelectronic means to convert the illuminated photographic image to an electrical signal indicative of the tread contact area;
means to generate a reference electrical signal indicative of a control tread contact area; and
means to compare the signal indicative of the tread contact area to the reference signal to provide a visual readout indicative of the difference between the two.

13. The apparatus as set forth in claim 12 wherein the colored fluid is a green-dyed fluid and the photosensitized medium is an orthochromatic film.

14. The apparatus as set forth in claim 13 wherein the fluid comprises an 0.5% solution of fluorescein sodium.

15. The apparatus as set forth in claim 13 wherein a high contrast photopositive is made for the tread contact image and the optoelectronic means comprises a photocell array for converting luminous energy reflected from the photopositive to an electrical signal.

16. The apparatus as set forth in claim 13 wherein a high contrast photonegative is made for the tread contact image and the optoelctronic means comprises a photocell array for converting luminous energy passing through the photonegative to an electrical signal.

17. Apparatus for analyzing tire tread patterns with respect to their surface contact area comprising:
    means to generate a tread contact image as defined by the tire tread contact area comprising a transparent plate having a colored fluid thereon to provide a contrast between tread areas in contact with the plate and areas not in contact with the plate;
    means to illuminate the tread contact image;
    a shutter TV positioned to accept the tread contact image through the plate and convert the illuminated image to an electrical signal indicative of the tread contact area;
    means to generate a reference electrical signal indicative of a control tread contact area; and
    means to compare the signal indicative of the tread contact area to the reference signal to provide a readout indicative of the difference between the two.

* * * * *

UNITED STATES PATENT AND TRADEMARK OFFICE
CERTIFICATE OF CORRECTION

PATENT NO. : 4,095,464
DATED : June 20, 1978
INVENTOR(S) : Frans Nico Breedijk

It is certified that error appears in the above-identified patent and that said Letters Patent are hereby corrected as shown below:

Column 3, lines 57 and 66, "12" should be -- 22 --.

Signed and Sealed this

Twenty-sixth Day of February 1980

[SEAL]

Attest:

SIDNEY A. DIAMOND

Attesting Officer

Commissioner of Patents and Trademarks